United States Patent
Wen et al.

(10) Patent No.: US 10,785,654 B1
(45) Date of Patent: Sep. 22, 2020

(54) WIRELESS DEVICE AND WIRELESS TRANSMISSION METHOD

(71) Applicant: FUJITSU LIMITED, Kanasaki-shi, Kanagawa (JP)

(72) Inventors: Yun Wen, Kawasaki (JP); Makoto Yoshida, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/751,387

(22) Filed: Jan. 24, 2020

(30) Foreign Application Priority Data

Mar. 22, 2019 (JP) .................. 2019-054276

(51) Int. Cl.
*H04W 12/12* (2009.01)
*H04B 1/04* (2006.01)
*H04B 7/06* (2006.01)

(52) U.S. Cl.
CPC ............. *H04W 12/12* (2013.01); *H04B 1/04* (2013.01); *H04B 7/0615* (2013.01)

(58) Field of Classification Search
CPC ........ H04B 10/5161; H04B 2203/5441; H04B 1/04; H04B 7/0615; H04W 12/12; H04L 1/0041
See application file for complete search history.

(56) References Cited

U.S. PATENT DOCUMENTS

| | | | | |
|---|---|---|---|---|
| 4,679,210 A | * | 7/1987 | Rathi | G01S 13/288 342/145 |
| 9,407,467 B2 | * | 8/2016 | Safier | H04L 25/14 |
| 2002/0118736 A1 | * | 8/2002 | Yamaguchi | H04L 27/18 375/222 |
| 2004/0240581 A1 | * | 12/2004 | Salapski | H04B 17/15 375/295 |
| 2006/0003710 A1 | | 1/2006 | Nakagawa et al. | |

(Continued)

FOREIGN PATENT DOCUMENTS

| | | |
|---|---|---|
| JP | 2004-266818 A | 9/2004 |
| WO | 2009/022423 A1 | 2/2009 |

OTHER PUBLICATIONS

Goel, Satashu et al., "Guaranteeing Secrecy using Artificial Noise," IEEE Transaction on Wireless Communications, vol. 7, No. 6, pp. 2180-2189, Jun. 2008.

(Continued)

*Primary Examiner* — Khanh C Tran
(74) *Attorney, Agent, or Firm* — Fujitsu Patent Center

(57) ABSTRACT

A wireless device includes: a plurality of antennas; a first correlation series generator configured to generate a first correlation series based on transmission data; a second correlation series generator configured to generate a second correlation series based on the first correlation series; a first modulator configured to modulate the transmission data to generate a first modulated signal; a second modulator configured to modulate the first correlation series to generate a second modulated signal; a third modulator configured to modulate the second correlation series to generate a third modulated signal; a signal combiner configured to combine the first to third modulated signals to generate first to third transmission signals; and a transmitter configured to output the first to third transmission signals respectively via first to third antennas among the plurality of antennas.

11 Claims, 13 Drawing Sheets

(56) References Cited

U.S. PATENT DOCUMENTS

2013/0176166 A1\* 7/2013 Kishigami ............ G01S 13/288
  342/202
2020/0162172 A1\* 5/2020 Sridhar ................. H04B 10/85

OTHER PUBLICATIONS

Zarzoso, Vicente et al., "Robust Independent Component Analysis by Iterative Maximization of the Kurtosis Contrast With Algebraic Optimal Step Size", IEEE Transactions on Neural Networks, vol. 21, No. 2, pp. 248-261, Feb. 2010.

Liu, Shuiyin et al., "Artificial Noise Revisited," IEEE Transactions on Information Theory, vol. 61, No. 7, pp. 3901-3911, Jul. 2015.

Conti, Mauro et al., "The Dark Side(-Channel) of Mobile Devices: A Survey on Network Traffic Analysis," IEEE Communications Surveys & Tutorials, vol. 20, No. 4, pp. 2658-2713, Fourth Quarter 2018.

\* cited by examiner

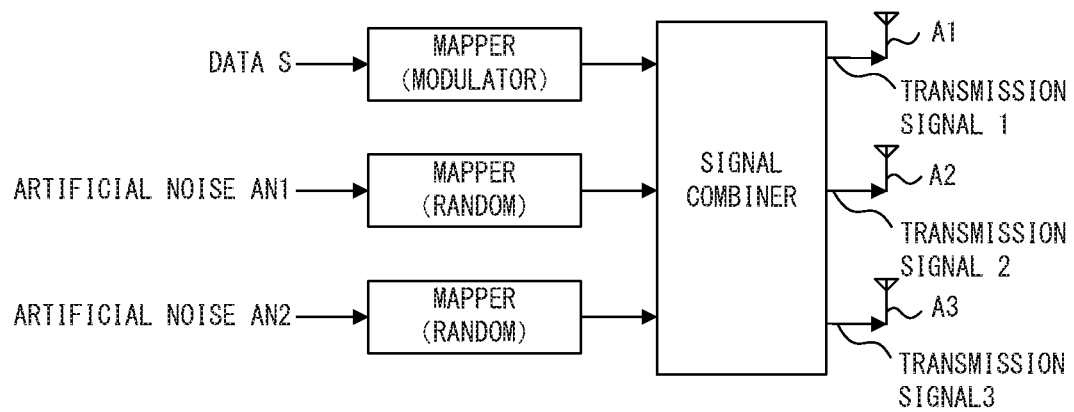
F I G. 2

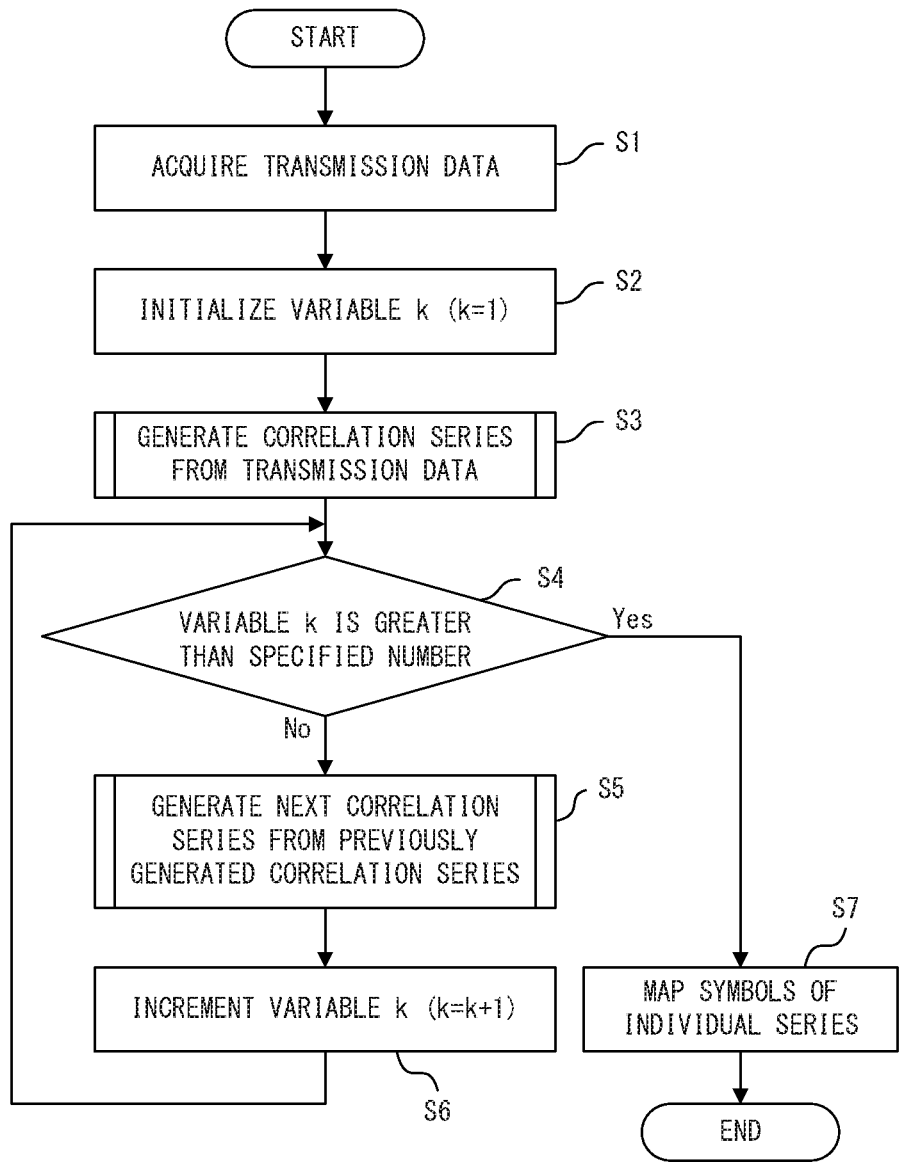
F I G. 6

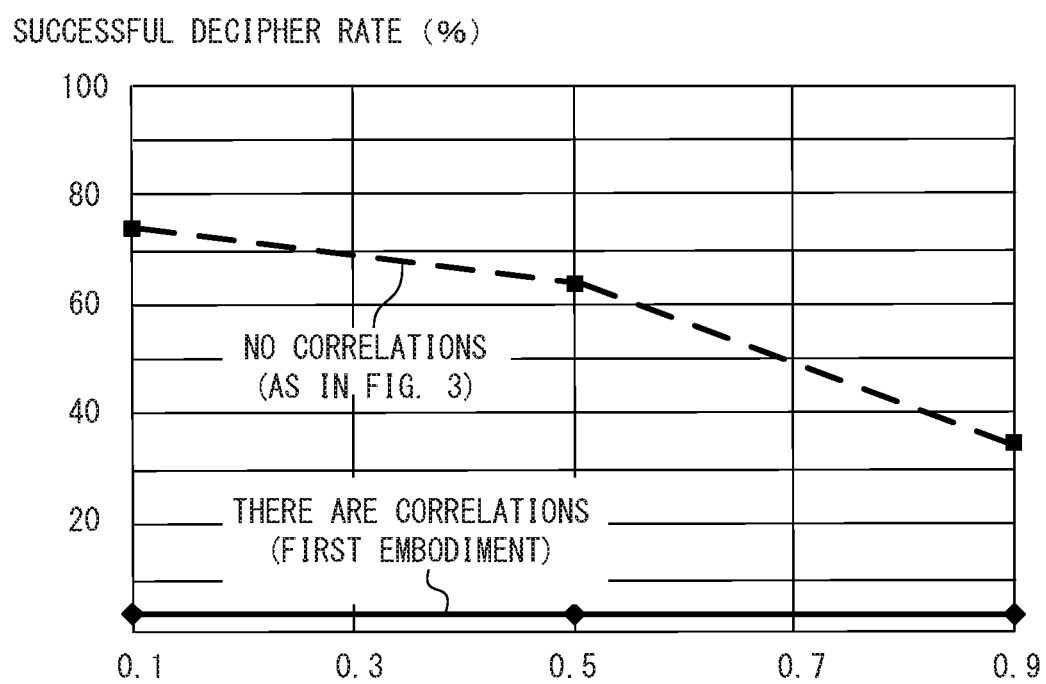
F I G. 8

| NUMBER OF ANTENNAS | MODULATION SCHEME | CHANNEL CORRELATION | CORRELATION COEFFICIENT (BETWEEN DATA AND ARTIFICIAL NOISES) | CORRELATION COEFFICIENT (BETWEEN ARTIFICIAL NOISES) |
|---|---|---|---|---|
| 3 | QPSK | NO | 0.5 | 0.9 |
| 3 | QPSK | YES | 0.4 | 0.9 |
| 3 | 16QAM | NO | 0.1 | 0.9 |
| 3 | 16QAM | YES | 0 | 0.9 |
| 4 | QPSK | NO | 0.4 | 0.9 |
| 4 | QPSK | YES | 0.3 | 0.9 |
| 4 | 16QAM | NO | 0 | 0.9 |
| 4 | 16QAM | YES | 0 | 0.7 |

FIG. 10

WIRELESS DEVICE AND WIRELESS TRANSMISSION METHOD

CROSS-REFERENCE TO RELATED APPLICATION

This application is based upon and claims the benefit of priority of the prior Japanese Patent Application No. 2019-054276, filed on Mar. 22, 2019, the entire contents of which are incorporated herein by reference.

FIELD

The embodiments discussed herein are related to a wireless device and a wireless transmission method.

BACKGROUND

In wireless communications, radio waves also arrive at terminal devices other than a destination node. Hence, such communications will involve a higher risk of interception than wire communications such as optical fiber communications. Accordingly, a proposed method is one for implementing a secure communication by using characteristics of a wireless channel between a source node and a destination node in addition to mathematical encryption for encrypting transmission data.

For example, the source node may transmit a signal to which distortions in the wireless channel between the source node and the destination node have been added. Then, the destination node receives the signal with the distortions canceled out in the wireless channel. Hence, the destination node can recover data from the received signal. However, since the wireless channel between the source node and another terminal device is different from that between the source node and the destination node, distortions in a signal arriving at the other terminal device are not canceled out. Hence, the other terminal device cannot recover data from the received signal (e.g., International Publication Pamphlet No. WO 2009/022423).

However, in many cases, wireless signals are transmitted using signal points (phase and amplitude) corresponding to a constellation based on a specified modulation scheme, and hence candidates for signal points of individual symbols are known. Thus, an interception node could recover data from a signal transmitted from a source node to a destination node by compensating for distortions in the wireless channel by using the differences between the signal point of the received signal and candidates for the signal point.

A method for implementing a secure communication using artificial noise when a source node includes a plurality of antennas has been proposed (e.g., Japanese Laid-open Patent Publication No. 2004-266818 and reference document 1). In this scheme, the source node generates, according to a wireless channel between the source node and the destination node, artificial noise to be canceled out at the destination node. Then, the source node performs the precoding of a data signal and the artificial noise and transmits a plurality of signals obtained from the precoding via a plurality of antennas. Hence, the destination node can recover data from the signal with the artificial noise canceled out. In addition, related arts are described in reference documents 2 and 3.

Reference Document 1: S. Goel and R. Negi, "Guaranteeing Secrecy using Artificial Noise," IEEE Trans. Wireless Commun., VOL. 7, NO. 6, pp. 2180-2189, JUNE 2008

Reference Document 2: Vicente Zarzoso and Pierre Comon, "Robust Independent Component Analysis by Iterative Maximization of the Kurtosis Contrast With Algebraic Optimal Step Size", IEEE TRANSACTIONS ON NEURAL NETWORKS, VOL. 21, NO. 2, FEBRUARY 2010

Reference Document 3: S. Liu, Y. Hong, and E. Viterbo, "Artificial Noise Revisited," IEEE Trans. Inf. Theory, VOL. 61, NO. 7, pp. 3901-3911, JULY 2015

In a secure communication using artificial nose, the artificial noise in a received signal is canceled out, as described above, at a destination node, and the artificial noise remains in a received signal at another terminal device. Hence, it is difficult for the other terminal device to recover data from the received signal.

However, when the number of reception antennas of an interception node is larger than the number of transmission antennas of the source node, the interception node could separate an artificial noise series from a received signal without recognizing a signal combining scheme based on precoding performed by the source node (e.g., non-patent document 2). In this case, the interception node could recover data.

SUMMARY

According to an aspect of the embodiments, a wireless device includes: a plurality of antennas; a first correlation series generator configured to generate a first correlation series based on transmission data; a second correlation series generator configured to generate a second correlation series based on the first correlation series; a first modulator configured to modulate the transmission data to generate a first modulated signal; a second modulator configured to modulate the first correlation series to generate a second modulated signal; a third modulator configured to modulate the second correlation series to generate a third modulated signal; a signal combiner configured to combine the first modulated signal, the second modulated signal and the third modulated signal to generate a first transmission signal, a second transmission signal and a third transmission signal; and a transmitter configured to output the first transmission signal, the second transmission signal and the third transmission signal respectively via a first antenna, a second antenna and a third antenna among the plurality of antennas.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 illustrates an example of a concealing method using artificial noises;

FIG. 6 is a flowchart illustrating an example of a process performed by a signal generator;

FIG. 8 illustrates an example of an effect achieved in accordance with a first embodiment;

FIG. 10 illustrates an example of a table that stores information for determining a correlation coefficient;

DESCRIPTION OF EMBODIMENTS

Figure 1:
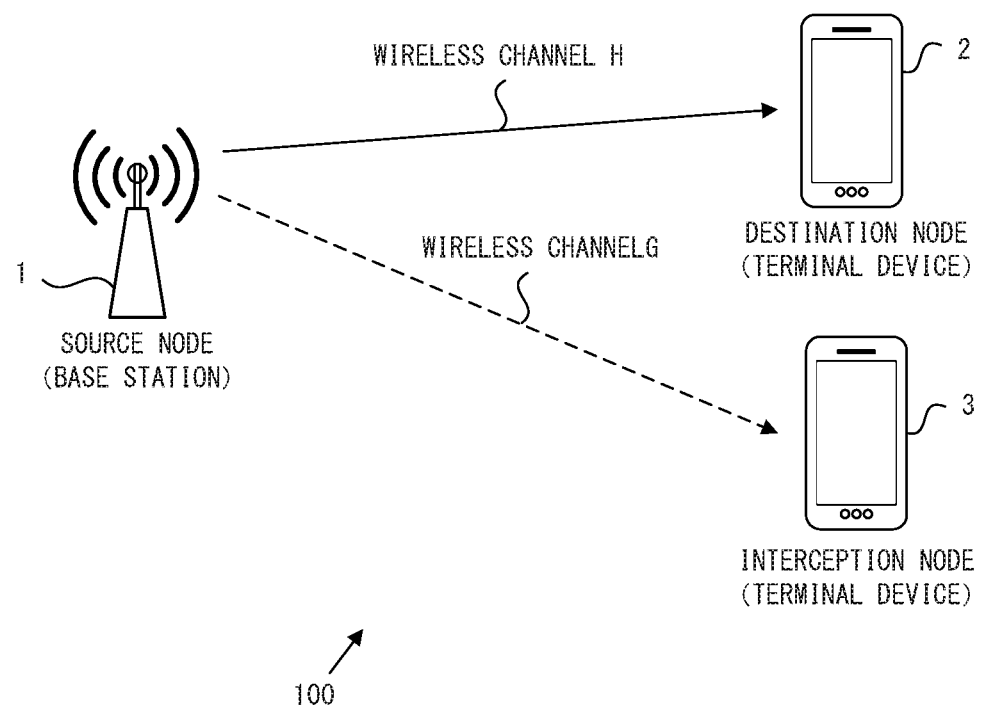
FIG. 1 illustrates an example of a wireless communication system.

FIG. 1 illustrates an example of a wireless communication system in accordance with embodiments of the invention. The wireless communication system 100 includes a source node 1, a destination node 2, and an interception node 3. For example, the source node 1 may be implemented by a base station. In this case, the destination node 2 and the interception node 3 are each implemented by a terminal device (or user equipment). The source node 1, the destination node 2, and the interception node 3 are each an example of a wireless device.

The source node 1 transmits data to the destination node 2. However, a wireless signal carrying the data arrives not at only the destination node 2 but also at the interception node 3. Thus, the source node 1 has a function for concealing the wireless signal so as to prevent the interception node 3 from deciphering the data. Specifically, the source node 1 has a function for concealing transmission data by using artificial noise.

Concealing Based on Artificial Noise

FIG. 2 illustrates an example of a concealing method using artificial noise. In this example, the source node 1 transmits data S to the destination node 2. Data S is represented as a symbol of s1, s2, . . . , sn. Each symbol of data S is mapped onto a constellation in accordance with a designated modulation scheme. The source node 1 also generates artificial noise series AN1 and AN2. Each symbol of the artificial noise series AN1 and AN2 is randomly mapped onto the constellation. A signal combiner generates transmission signals 1-3 by combining signals output from mappers. Each of the transmission signals 1-3 includes data S and artificial noises AN1 and AN2. The signal combiner generates the transmission signals 1-3 according to a wireless channel H between the source node 1 and the destination node 2 so that the artificial noises AN1 and AN2 can be canceled out at the destination node 2. As depicted in FIG. 2, the transmission signals 1-3 are output respectively via antennas A1-A3.

The transmission signals 1-3 propagate to the destination node 2 via the wireless channel H. The artificial noises AN1 and AN2 are canceled out in the wireless channel H. Hence, the destination node 2 can recover data S from the received signals. The transmission signals 1-3 also propagate to the interception node 3 via a wireless channel G. However, since the transmission signals 1-3 have been generated according to the wireless channel H, and the wireless channel G is different from the wireless channel H, the artificial noises AN1 and AN2 remain in the interception node 3. Hence, the interception node 3 cannot recover data S from the received signals.

However, in the example depicted in FIG. 2, each symbol of the artificial noises AN1 and AN2 is transmitted using a random phase/amplitude. Accordingly, the occurrence frequency of the phase/amplitude of the artificial noises AN1 and AN2 is dependent on Gaussian distribution. Hence, there are no correlations between data S and the artificial noises AN1 and AN2, and there are no correlations between the artificial noises AN1 and AN2.

In the meantime, researches have been carried out on a method for separating, at a reception node, a plurality of signals combined at a source node. For example, the blind source separation or the blind equalization may allow a plurality of combined signals to be separated without using information on a wireless channel between a source node and a reception node. The independent component analysis (ICA) among these is known as a representative separation method.

When a plurality of signals combined at a source node are independent of each other, the ICA allows these signals to be separated with a high probability. In the example depicted in FIG. 2, there are no correlations between data S and the artificial noises AN1 and AN2, and there are no correlations between the artificial noises AN1 and AN2. Hence, when the number of reception antennas of the interception node 3 is larger than the number of transmission antennas of the source node 1, the interception node 3 can separate data S from the artificial noises AN1 and AN2 with a high probability by using the ICA.

Figure 3:
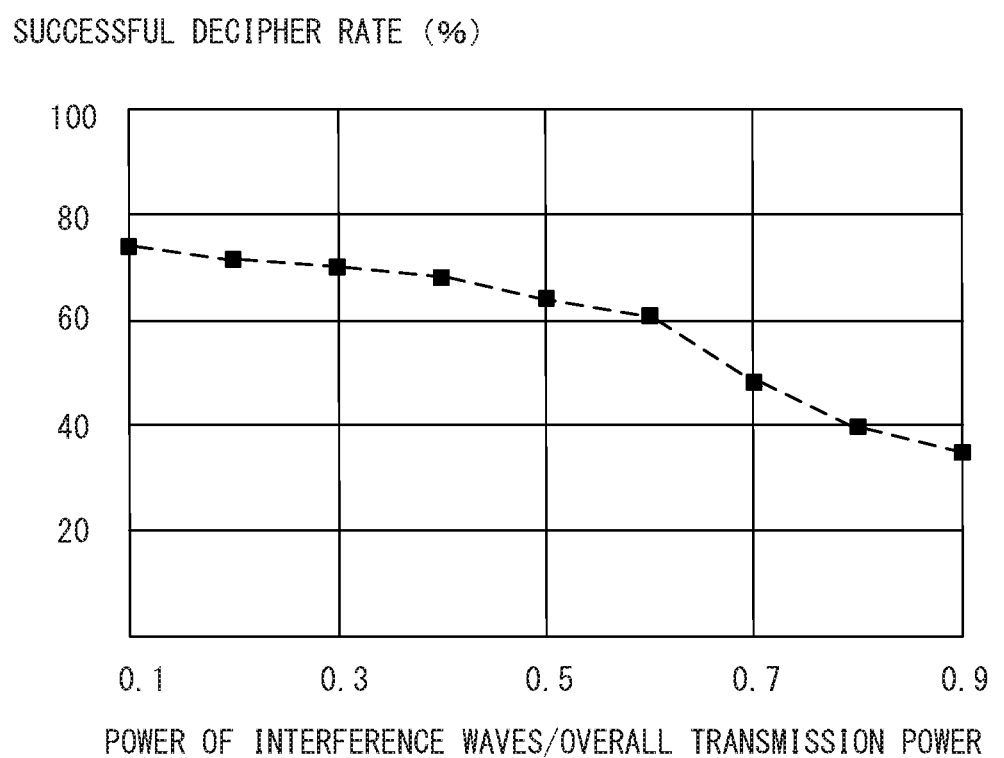
FIG. 3 illustrates an example of a simulation result of a successful decipher rate.

FIG. 3 illustrates an example of a simulation result of a successful decipher rate that could be achieved if data is transmitted using the method depicted in FIG. 2 and the interception node 3 uses the ICA. According to this simulation, data S is deciphered with a very high probability when the power of interference waves (i.e., the power of artificial noise) is low. Data S is also deciphered with a probability of about 40 percent even when the power of interference waves is high.

First Embodiment

Figure 4:
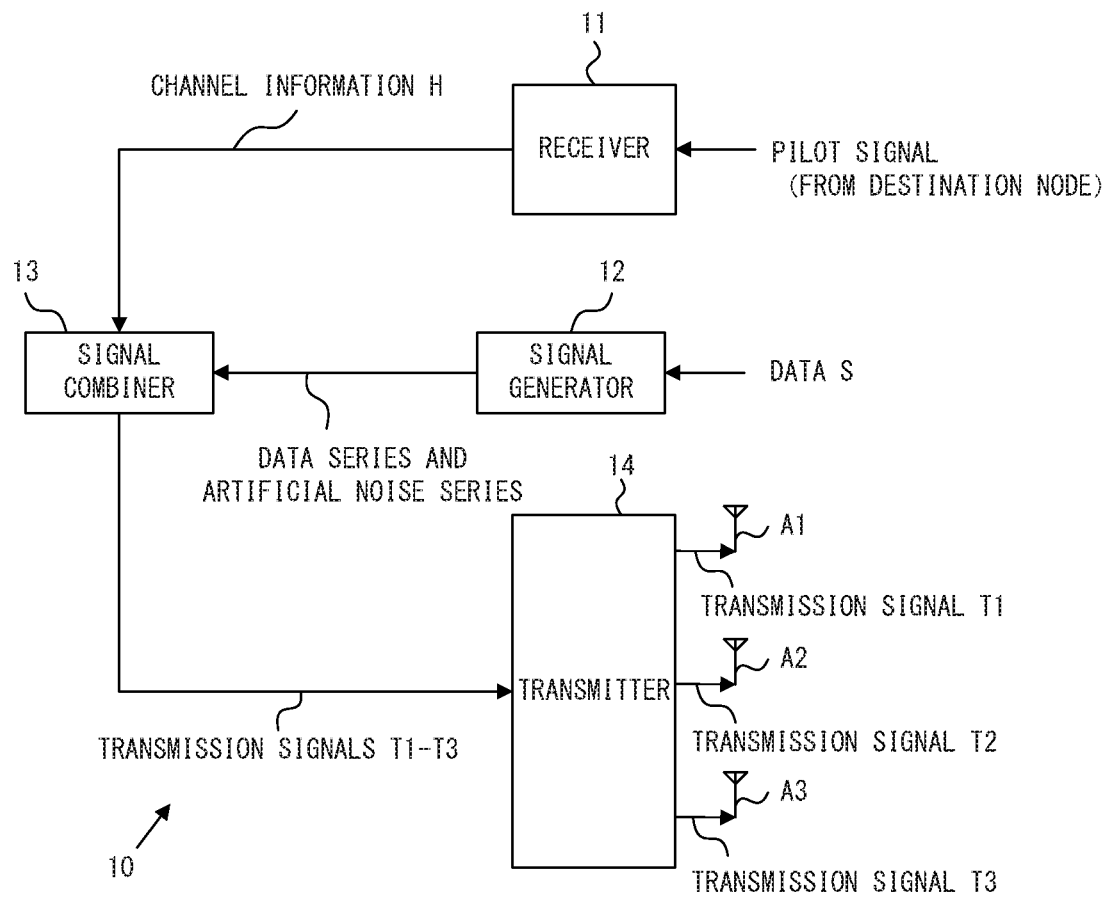
FIG. 4 illustrates an example of a wireless device in accordance with a first embodiment.

FIG. 4 illustrates an example of a wireless device in accordance with a first embodiment of the invention. For example, a wireless device 10 may correspond to the base station (source node) 1 in the wireless communication system depicted in FIG. 1. The following descriptions are based on the assumption that the wireless device 10 transmits data S to the terminal device (destination node) 2 depicted in FIG. 1.

As depicted in FIG. 4, the wireless device 10 includes a receiver 11, a signal generator 12, a signal combiner 13, a transmitter 14, and a plurality of transmission antennas A1-A3. However, the wireless device 10 may include functions or elements that are not depicted in FIG. 4. For example, the wireless device 10 may include one or more reception antennas.

The receiver 11 receives a wireless signal transmitted from another wireless device. Each wireless device periodically transmits a pilot signal. The pilot signal has a known transmission power and a known bit pattern. Thus, the receiver 11 can estimate the state of a wireless channel by receiving and demodulating the pilot signal. In this example, the receiver 11 receives and demodulates a pilot signal transmitted from the destination node 2 so as to estimate the wireless channel H between the wireless device 10 and the destination node 2. Channel information indicating the wireless channel H is supplied from the receiver 11 to the signal combiner 13.

The signal generator 12 generates a data series and artificial noise series from data S. In this example, a data series S and artificial noise series AN1 and AN2 are generated. Data S is supplied from an application (or application layer) to the wireless device 10. There are correlations between the data series and the artificial noise series, as will be described hereinafter in detail. When a plurality of artificial noises are generated, there will also be correlations between these artificial noises.

The signal combiner 13 combines the data series and the artificial noise series according to the channel information indicating the wireless channel H. In particular, the signal combiner 13 performs a precoding process for the data series and the artificial noise series according to the channel information indicating the wireless channel H. As a result, transmission signals T1-T3 are generated. This precoding process is such that the transmission signals T1-T3 are generated in such a manner as to cancel out the artificial noise at the wireless channel H when these signals are transmitted from the wireless device 10.

The transmitter 14 outputs the transmission signals T1-T3 via the antennas A1-A3. Specifically, the transmission signal T1 is output via the antenna A1, the transmission signal T2 is output via the antenna A2, and the transmission signal T3 is output via the antenna A3.

The transmission signals T1-T3 propagate to the destination node 2 via the wireless channel H. The transmission signals T1-T3 have been generate in such a manner as to cancel out the artificial noise at the wireless channel H. Hence, the artificial noises AN1 and AN2 are canceled out at the wireless channel H, and the destination node 2 can recover data S from the received signals. The transmission signals T1-T3 also propagate to the interception node 3 via the wireless channel G. However, since the transmission signals T1-T3 have been generated according to the wireless channel H, the artificial noises AN1 and AN2 remain in the interception node 3. Hence, the interception node 3 cannot recover data S from the received signals.

The signal generator 12 and the signal combiner 13 may be implemented by a processor system that includes a processor and a memory. In this case, the processor provides the functions of the signal generator 12 and the signal combiner 13 by executing a program stored in the memory. The signal generator 12 and the signal combiner 13 may be implemented by one or more processor systems. Alternatively, the signal generator 12 and the signal combiner 13 may be implemented by a digital signal processing circuit. In addition, the signal generator 12 and the signal combiner 13 may be implemented by a combination of software processing and a hardware circuit.

Figure 5:
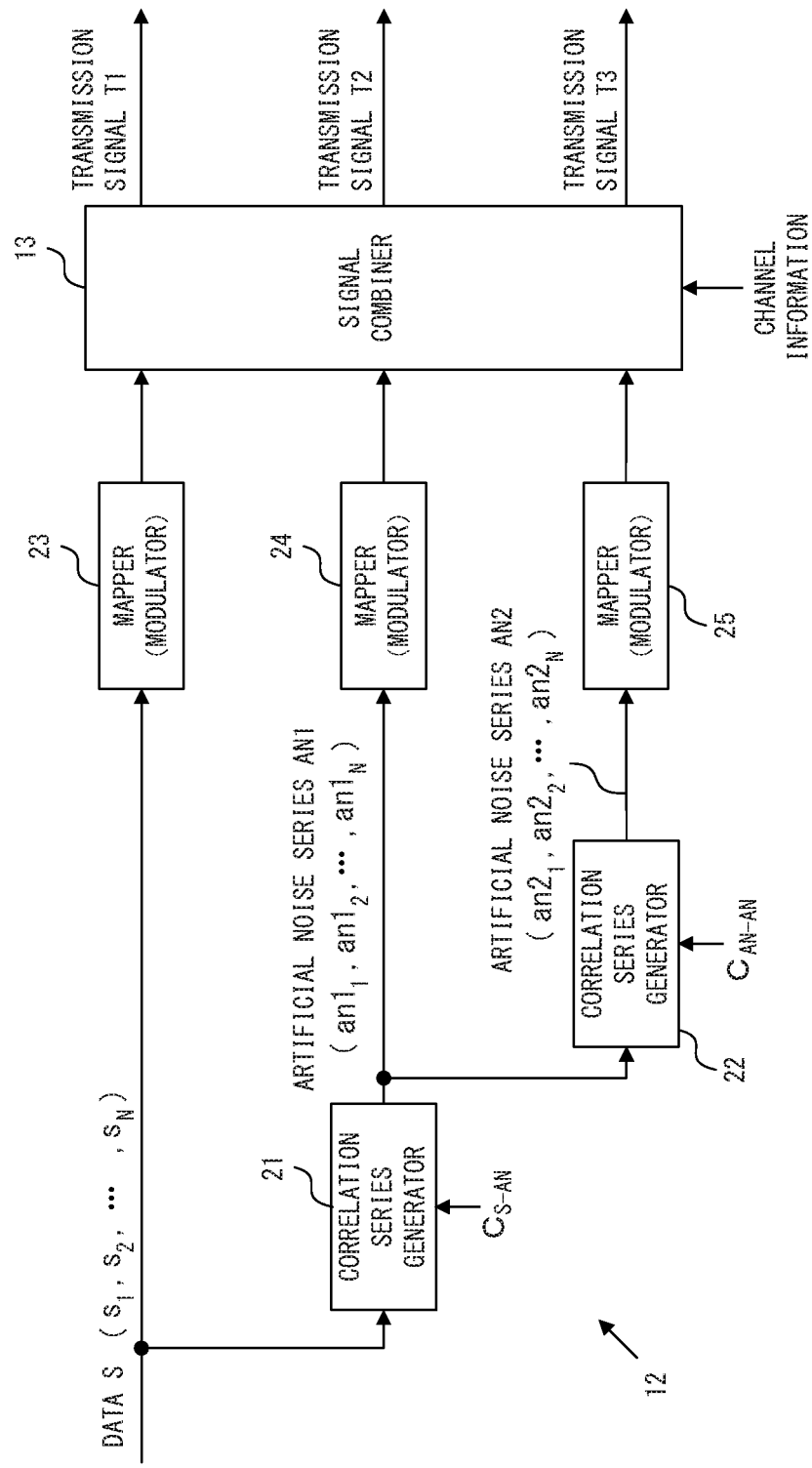
FIG. 5 illustrates an example of a signal generator.

FIG. 5 illustrates an example of the signal generator 12. In this example, the signal generator 12 includes correlation series generators 21-22 and mappers 23-25. The signal generator 12 may include functions or elements that are not depicted in FIG. 5. The signal generator 12 is supplied with data S. In this example, data S is represented as a symbol string ($S_1$ to $S_N$). Each symbol carries data with as many bits as are dependent on a modulation scheme. For example, when the wireless device 10 transmits data in accordance with QPSK, each symbol may transmit two bits of data. When the wireless device 10 transmits data in accordance with 16QAM, each symbol transmits four bits of data.

The correlation series generator 21 generates a first correlation series according to data S. The first correlation series is used as an artificial noise. Accordingly, a first correlation series generated by the correlation series generator 21 may hereinafter be referred to as an "artificial noise series AN1". The artificial noise series AN1 is represented as a symbol string ($an1_1$ to $an1_N$) The number of symbols of the artificial noise series AN1 is equal to that of data S.

The correlation series generator 22 generates a second correlation series according to the artificial noise series AN1. The second correlation series is also used as an artificial noise. Accordingly, a second correlation series generated by the correlation series generator 22 may hereinafter be referred to as an "artificial noise series AN2". The artificial noise series AN2 is represented as a symbol string ($an2_1$ to $an2_N$). The number of symbols of the artificial noise series AN2 is also equal to that of data S.

The mapper (modulator) 23 sequentially maps the symbols of data S onto a constellation in accordance with a designated modulation scheme. As a result, a modulated signal indicating data S is generated. For example, when the wireless device 10 transmits data in accordance with QPSK, each symbol may be mapped to a signal point that corresponds to the value (00, 01, 10, 11) of the symbol. As a result of this mapping process, each symbol is expressed as, for example, a complex number. This complex number indicates the phase and amplitude of the signal.

The mapper (modulator) 24 sequentially maps the symbols of the artificial noise series AN1 onto the constellation in accordance with a designated modulation scheme. As a result, a modulated signal indicating the artificial noise series AN1 is generated. The mapper (modulator) 25 sequentially maps the symbols of the artificial noise series AN2 onto the constellation in accordance with a designated modulation scheme. As a result, a modulated signal indicating the artificial noise series AN2 is generated. Note that the mappers 23-25 preferably perform the mapping in accordance with the same modulation scheme.

The modulated signals generated by the mappers 23-25 are supplied to the signal combiner 13. Then, the signal combiner 13 combines these modulated signals according to the channel information indicating the wireless channel H between the wireless device 10 and the destination node 2. As a result, transmission signals T1-T3 are generated.

FIG. 6 is a flowchart illustrating an example of a process performed by the signal generator 12. The wireless device 10 has already acquired channel information indicating the wireless channel H between the wireless device 10 and the destination node 2 before performing the processes of the flowchart. For example, the wireless channel H may be estimated as a result of the receiver 11 receiving a pilot signal transmitted from the destination node 2.

In S1, the signal generator 12 acquires transmission data. The transmission data is supplied from an application (or application layer) to the wireless device 10. The signal generator 12 generates a data series from the transmission data in accordance with a modulation scheme used by the wireless device 10. For example, when the data is transmitted in accordance with QPSK, each symbol carries two bits of data. As a result, a data series ($S_1$-$S_N$) is obtained.

In S2, the signal generator 12 initializes and sets a variable k as 1. The variable k is used to count the number of artificial noise series to be generated.

In S3, the signal generator 12 generates a first artificial noise series according to the data series. In particular, an artificial noise series AN1 is generated. In the example depicted in FIG. 5, the correlation series generator 21 generates the artificial noise series AN1. A method for generating the artificial noise series AN1 will be described hereinafter by referring to FIG. 7.

In S4, it is decided whether the variable k is greater than a specified number. In this example, the specified number is "the number of transmission antennas of the wireless device 10 minus 2". In the example depicted in FIG. 4, the wireless device 10 includes three antennas (A1-A3). Hence, in this case, the specified number is "1", and it is decided whether the variable k is greater than 1.

When the variable k is not greater than the specified number, the signal generator 12 generates, in S5, a new artificial noise series according to the artificial noise series that has already been generated. For example, when an artificial noise series AN1 has already been generated in the example depicted in FIG. 5, the correlation series generator 22 may generate an artificial noise series AN2 according to the artificial noise series AN1. A method for generating a new artificial noise series according to a previously generated artificial noise series is substantially the same as the method for generating an artificial noise series according to a data series and will be described hereinafter by referring to FIG. 7.

In S6, the signal generator 12 increments the variable k by one. Subsequently, the process of the signal generator 12 returns to S4. In this way, the signal generator 12 repeatedly performs the processes of S4-S6 until the variable k exceeds the specified number. Thus, the number of artificial noise series to be generated will be "the number of antennas minus 1". In this case, an (i+1)-th artificial noise series is generated according to an i-th artificial noise series. In the example depicted in FIGS. 4-5, two artificial noise series (AN1, AN2) are generated. Note that the sum of the number of data series and the number of artificial noise series is equal to the number of transmission antennas of the wireless device 10.

When the variable k exceeds the specified number (S4: Yes), the signal generator 12 performs mapping for each symbol of each series in S7. In the example depicted in FIG. 5, the mapper 23 generates a modulated signal indicating the data series, the mapper 24 generates a modulated signal indicating the artificial noise series AN1, and the mapper 25 generates a modulated signal indicating the artificial noise series AN2. The signal combiner 13 combines these modulated signals.

Figure 7:
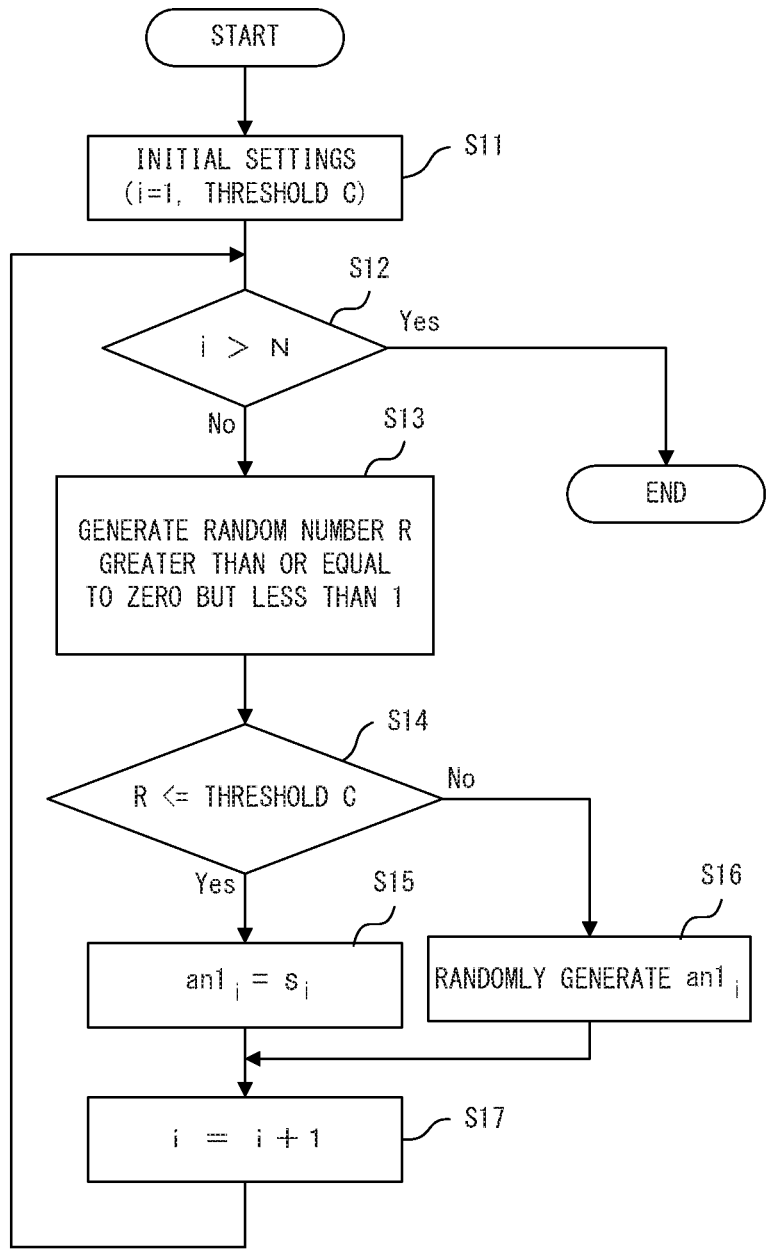
FIG. 7 is a flowchart illustrating an example of a method for generating an artificial noise series.

FIG. 7 is a flowchart illustrating an example of a method for generating an artificial noise series. The processes of this flowchart correspond to S3 in FIG. 6. Thus, the correlation series generator 21 generates an artificial noise series AN1 from a data series.

In S11, the correlation series generator 21 makes initial settings for a process of generating an artificial noise series. In particular, the correlation series generator 21 initializes and sets a variable i as 1. The variable i is used to identify the symbols of a data series. The correlation series generator 21 also obtains a threshold C. In the example depicted in FIG. 5, the threshold C corresponds to a coefficient $C_{S-AN}$ indicating the correlation between the data series and the artificial noise series. The threshold C is determined in advance through, for example, a simulation and stored in a memory provided for the wireless device 10.

In S12, the correlation series generator 21 decides whether the variable i is greater than N. N indicates the number of symbols of the data series. Thus, the correlation series generator 21 decides whether the processes of S13-S16 have been performed for all symbols in the data series. When the data series still includes a symbol for which the processes of S13-S16 have not been performed, the process of the correlation series generator 21 shifts to S13.

In S13, the correlation series generator 21 generates a random number R greater than or equal to zero but less than 1. In S14, the correlation series generator 21 compares the random number R generated in S13 with the threshold C.

When the random number R is less than or equal to the threshold C, the correlation series generator 21 determines, in S15, a symbol of the artificial noise series AN1 according to a corresponding symbol of the data series S. Specifically, a value equal to the value of an i-th symbol $S_i$ of the data series S is output as an i-th symbol $an1_i$ of the artificial noise series AN1. Note that each symbol is expressed as, for example, a complex number.

When the random number R is greater than the threshold C, the correlation series generator 21 determines, in S16, a symbol of the artificial noise series AN1 regardless of the data series S. In this case, the correlation series generator 21 randomly selects one of a plurality of signal points provided in accordance with a modulation scheme used by the wireless device 10. For example, when the wireless device 10 transmits data in accordance with QPSK, one signal point may be randomly selected from four signal points (00, 01, 10, 11) provided by QPSK. Then, the correlation series generator 21 outputs a value indicating the selected signal point as an i-th symbol $an1_i$ of the artificial noise series AN1.

In S17, the correlation series generator 21 increments the variable i by one. Subsequently, the process of the correlation series generator 21 returns to S12. Thus, the correlation series generator 21 performs the processes of S13-S16 for all symbols in the data series. As a result, an artificial noise series AN1 having as many symbols as the number of symbols of the data series is generated.

As described above, when the random number R is less than or equal to the threshold C, an artificial noise symbol based on data S is generated. When the random number R is greater than the threshold C, an artificial noise symbol irrelevant to data S is generated. Accordingly, the correlation between data S and the artificial noise AN1 is high when the threshold C is a large value, and low when the threshold C is a small value. Thus, the degree of correlation between data S and the artificial noise AN1 can be determined by adjusting the threshold C.

A method for generating a new artificial noise series from a previously generated artificial noise series is substantially the same as the method for generating an artificial noise series from a data series. Hence, a new artificial noise series may be generated from a previously generated artificial noise series in accordance with the flowchart depicted in FIG. 7. However, in the example depicted in FIG. 5, the process of generating a new artificial noise series from a previously generated artificial noise series is performed by the correlation series generator 22. The threshold used in the process of generating a new artificial noise series from a previously generated artificial noise series ($C_{AN-AN}$ in FIG. 5) may be different from the threshold used in the process of generating an artificial noise series from a data series ($C_{S-AN}$ in FIG. 5).

The signal combiner 13 combines the data series S and the artificial noise series AN1 and AN2. Accordingly, descriptions are given in the following of a precoding process performed by the signal combiner 13.

Let H indicate a wireless channel between the wireless device 10 and the destination node 2. In this case, H is a complex matrix with $N_B$ rows and $N_A$ columns. $N_A$ indicates the number of transmission antennas of the wireless device 10. $N_B$ indicates the number of reception antennas of the destination node 2.

The channel matrix H may be expressed as formula (1) by performing singular value decomposition of the channel matrix H.

$$H = U\Lambda V^H \tag{1}$$

U is a unitary matrix with $N_B$ rows and $N_B$ columns. V is a unitary matrix with $N_A$ rows and $N_A$ columns. $\Lambda$ is a complex matrix with $N_B$ rows and $N_A$ columns. The first to $N_B$-th rows and the first to $N_B$-th columns of A are a diagonal matrix. The elements on the diagonal lines in this diagonal matrix each correspond to a singular value. The ($N_B$+1)-th to $N_A$-th columns of A are a zero matrix.

The matrix V can be decomposed into a sub-matrix V1 with first to $N_B$-th columns and a sub-matrix Z with ($N_B$+1)-th to $N_A$-th columns ([V=V1, Z]). U, A, and V are obtained by performing singular value decomposition of the channel matrix H. Hence, HZ is a zero matrix. Z indicates a null space that corresponds to the wireless channel H.

The signal combiner 13 performs the precoding process by multiplying a signal vector formed from a data series and a plurality of artificial noise series by a vector V. The case depicted in FIGS. 4-5 will be described as an example. $N_A$ is 3 since the wireless device 10 includes three transmission antennas. It is assumed that the destination node 2 receives a wireless signal by using one reception antenna, and hence $N_B$ is 1.

Assume that a column vector $[s_1, an1_1, an2_1]^T$ formed from data S and artificial noises AN1 and AN2 in a first symbol is input to the signal combiner 13. The signal combiner 13 multiplies this column vector by a complex matrix V. This multiply operation is expressed as formula (2), where X indicates a transmission signal vector generated by the signal combiner 13.

$$X = \begin{pmatrix} v_{11} & z_{11} & z_{12} \\ v_{12} & z_{21} & z_{22} \\ v_{13} & z_{31} & z_{32} \end{pmatrix} \begin{pmatrix} s_1 \\ an1_1 \\ an2_1 \end{pmatrix} \quad (2)$$

Accordingly, transmission signals are expressed as formulae (3).

$$x1 = v_{11}s_1 + z_{11}an1_1 + z_{12}an2_1 \quad (3)$$
$$x2 = v_{21}s_1 + z_{21}an1_1 + z_{22}an2_1$$
$$x3 = v_{31}s_1 + z_{31}an1_1 + z_{32}an2_1$$

Transmission signals x1, x2, and x3 are output via the antennas A1, A2, and A3, respectively.

The destination node 2 receives the signals x1-x3 transmitted from the wireless device 10. Accordingly, a signal received by the destination node 2, i.e., received signal r1, is expressed as formula (4), where nd indicates noise power at the destination node 2.

$$r1 = Hx + nd \quad (4)$$
$$= HV_1s_1 + HZ[an1_1 \quad an2_1]^T + nd$$
$$= HV_1s_1 + nd$$
$$(\because HZ = 0)$$

As indicated above, since HZ is zero, artificial noise components are canceled out in the wireless channel H and becomes zero. Thus, the signal received by the destination node 2 includes no artificial noise components. Hence, the destination node 2 can recover the data symbol s1 from the received signal r1. Subsequent data symbols are also recovered in a similar manner.

By contrast, a signal received by the interception node 3, i.e., a received signal r2, is expressed as formula (5). In this formula, ne indicates noise power at the interception node 3.

$$r2 = Gx + ne \quad (5)$$
$$= GV_1s_1 + GZ[an1_1 \quad an2_1]^T + ne$$
$$(\because GZ \neq 0)$$

However, there are no correlations between the wireless channel H between the wireless device 10 and the destination node 2 and the wireless channel G between the wireless device 10 and the interception node 3. Thus, GZ is not zero, and the signal received by the interception node 3 includes artificial noise components. Hence, the interception node 3 cannot recover the data from the received signal r2.

In the meantime, as described above, when a plurality of signals combined at a source node are independent of each other, the interception node 3 can separate these signals from each other with a high probability by using the ICA. Accordingly, the interception node 3 could decipher transmission data when there are no correlations between the transmission data and artificial noises.

However, unlike in the configuration depicted in FIG. 2, the wireless device 10 in accordance with the first embodiment generates the values of the symbols of artificial noise series according to transmission data, i.e., does not randomly generate such values. Thus, artificial noise series generated by the wireless device 10 are non-Gaussian distribution signals. In addition, there are correlations between a plurality of signals combined by the signal combiner 13. Specifically, there are correlations between data S and an artificial noise AN1, and there are also correlations between artificial noises AN1 and AN2. Hence, it will be difficult to separate data S and the artificial noises AN1 and AN2 from each other by using the ICA.

FIG. 8 illustrates an example of an effect achieved in accordance with the first embodiment. In this example, artificial noise series AN1 and AN2 are generated in the configuration depicted in FIG. 5 by using the method illustrated in FIG. 7. QPSK is used as a modulation scheme. A threshold $C_{S-AN}$ used in the process of generating the artificial noise AN1 from data S is 0.5. A threshold $C_{AN-AN}$ used in the process of generating the artificial noise AN2 from the artificial noise AN1 is 0.9.

In this example, the interception node 3 has a successful decipher rate of about 3 percent when the wireless device 10 in accordance with the first embodiment transmits data S. Accordingly, the wireless device 10 in accordance with the first embodiment reduces the successful decipher rate of the interception node 3 by less than one-tenth in comparison with the configuration depicted in FIG. 2.

Second Embodiment

The threshold C is determined in advance in the first embodiment. By contrast, in the second embodiment, the threshold C is determined in accordance with a communication environment or the like.

Figure 9:
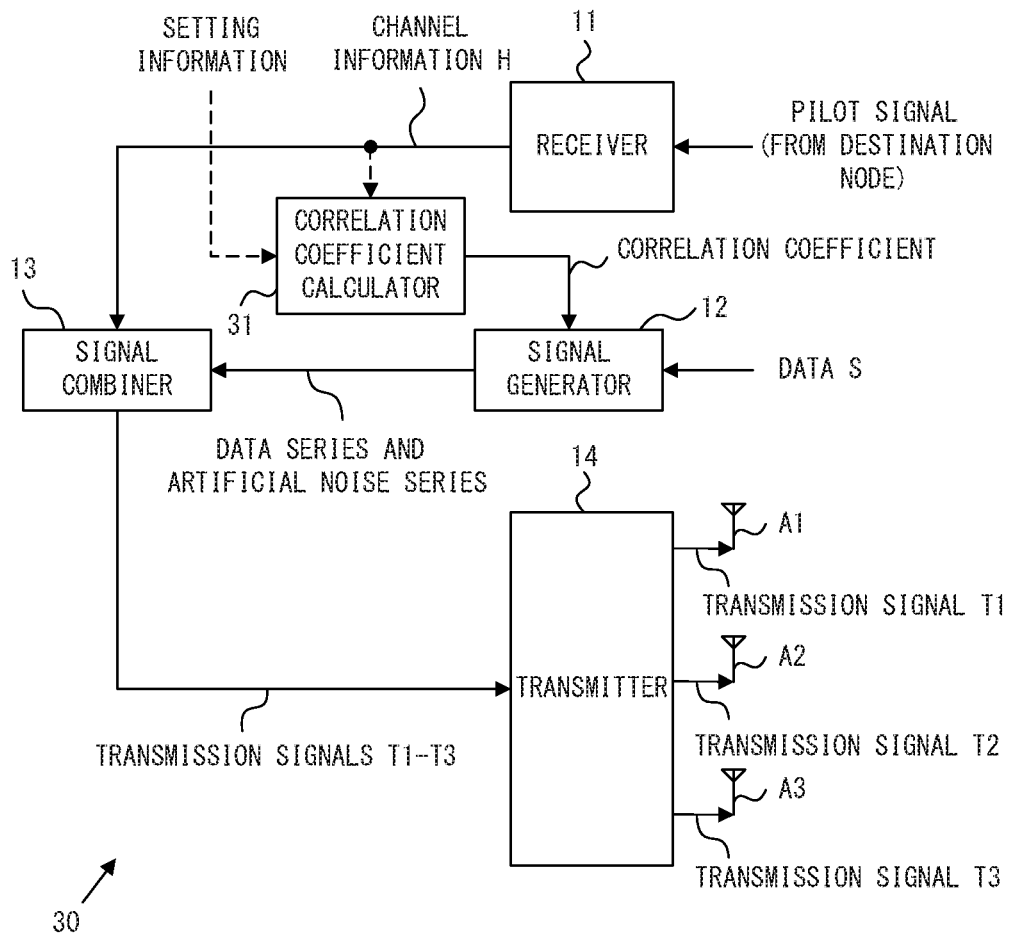
FIG. 9 illustrates an example of a wireless device in accordance with a second embodiment.

FIG. 9 illustrates an example of a wireless device in accordance with the second embodiment of the invention. A wireless device 30 includes a receiver 11, a signal generator 12, a signal combiner 13, a transmitter 14, a plurality of transmission antennas A1-A3, and a correlation coefficient calculator 31. The receiver 11, the signal generator 12, the signal combiner 13, the transmitter 14, and the plurality of transmission antennas A1-A3 in the second embodiment are substantially the same as those in the first embodiment.

As depicted in FIG. 9, the correlation coefficient calculator 31 determines a correlation coefficient in accordance with setting information and/or the state of a wireless channel. The correlation coefficient includes a coefficient indicating a correlation between a data series and artificial noise series and a coefficient indicating a correlation between the artificial noise series.

For example, the correlation coefficient calculator 31 may determine a correlation coefficient in accordance with a concealing capability demanded by a wireless communication system. When the interception node 3 attempts to separate a signal by using the ICA, a higher correlation coefficient will make transmission data less likely to be deciphered. Hence, when a high concealing capability is demanded, the correlation coefficient calculator 31 will preferably set a high correlation coefficient. Meanwhile, when a low concealing capability is demanded, the correlation coefficient calculator 31 may set a low correlation coefficient. In the example depicted in FIG. 9, the concealing capability demanded by the wireless communication system is reported to the correlation coefficient calculator 31 as setting information.

The correlation coefficient calculator 31 may determine a correlation coefficient in accordance with the number of transmission antennas of the wireless device 30. When there are many transmission antennas, there will be a large number of artificial noise series, thereby making transmission data unlikely to be deciphered. Hence, when there are many transmission antennas, the correlation coefficient calculator 31 may set a low correlation coefficient. When there are few transmission antennas, the correlation coefficient calculator 31 will preferably set a high correlation coefficient. In the example depicted in FIG. 9, the number of transmission antennas of the wireless device 30 is reported to the correlation coefficient calculator 31 as setting information.

A plurality of channels (or paths) are configured between a plurality of antennas of the source node and one or more antennas of the reception node. The degrees of the correlations between the channels are dependent on an environment where the source node and the reception node are provided. In particular, the correlation between channels is likely to be low in a multipath environment (e.g., indoor environment) where many reflections or diffractions occur. By contrast, the correlation between channels is likely to be high in an environment (e.g., outdoor open space) where multipath propagation rarely occurs.

When the correlation between channels is high, the correlation between signals received by the interception node 3 becomes high, and the analytical performance based on the ICA is likely to be low. Hence, when the correlation between channels is high, the correlation coefficient calculator 31 may set a low correlation coefficient. When the correlation between channels is low, the correlation coefficient calculator 31 will preferably set a high correlation coefficient. The wireless device 30 can estimate a multipath environment between the wireless device 30 and the destination node 2 (i.e., correlation between channels) by using a pilot signal transmitted from the destination node 2.

The decipherability of the ICA is dependent on a modulation scheme for transmitting data. For example, a modulation scheme that involves a large number of bits per symbol may provide distribution of data signals mapped on a constellation that is close to Gaussian distribution. The deciphering based on the ICA is difficult to perform when the distribution of data signals is close to Gaussian distribution. Hence, when data is transmitted using a modulation scheme that involves a large number of bits per symbol, the coefficient correlation calculator 31 may set a low correlation coefficient. When data is transmitted using a modulation scheme that involves a small number of bits per symbol, the correlation coefficient calculator 31 will preferably set a high correlation coefficient. In the example depicted in FIG. 9, the modulation scheme for transmitting data is reported to the correlation coefficient calculator 31 as setting information.

For example, the determination of a correlation coefficient may be realized by referring a table depicted in FIG. 10. In this example, a correlation coefficient is set for a combination of the number of transmission antennas of the wireless device 30, a modulation scheme, and a multipath environment. This relation is created in advance through, for example, a simulation or measurement. The correlation coefficient calculator 31 may determine a correlation coefficient by referring to the table depicted in FIG. 10 according to setting information and channel information.

The correlation coefficient is used as the threshold C in the example depicted in FIG. 5 or 7. Accordingly, a higher correlation coefficient will provide a higher correlation between series. In particular, as a correlation coefficient to be used as the threshold $C_{S-AN}$ increases, the correlation between data and an artificial noise becomes higher. Meanwhile, as a correlation coefficient to be used as the threshold $C_{AN-AN}$ increases, the correlation between artificial noises becomes higher.

As described above, when the interception node 3 uses the ICA, a higher correlation coefficient will make transmission data less likely to be deciphered. Thus, using a higher correlation coefficient will increase the concealing capability. However, when the correlation coefficient is high, deciphering one of a plurality of signal series is likely to result in the deciphering of the other series as well. Thus, an excessively high correlation coefficient could lead to a decreased concealing capability. Accordingly, a correlation coefficient will preferably be determined with these facts taken into consideration.

For example, when the wireless communication system demands a low concealing capability, decreasing the correlation coefficient between transmission data and artificial noises may be prioritized over decreasing the correlation coefficient between the artificial noises. In this case, even if the artificial noises are deciphered, it will be difficult to estimate the transmission data from the artificial noises.

Third Embodiment

In the first and second embodiments, an artificial noise series AN1 is generated from a data series S, and an artificial noise series AN2 is generated from the artificial noise series AN1. By contrast, in the third embodiment, artificial noise series AN1 and AN2 are generated from a data series S.

Figure 11:
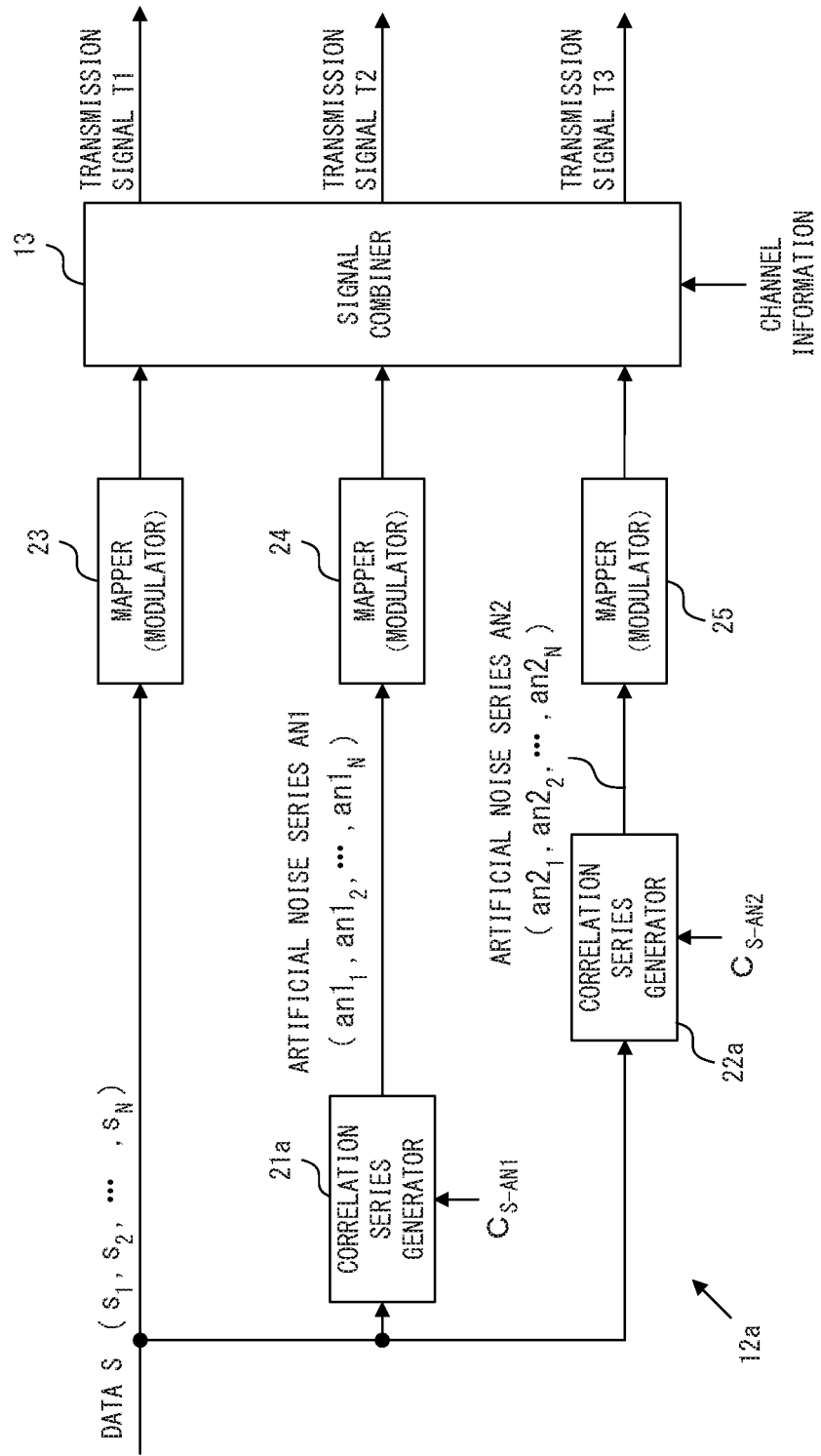
FIG. 11 illustrates an example of a signal generator in accordance with a third embodiment.

FIG. 11 illustrates an example of a signal generator in accordance with the third embodiment. In the third embodiment, a signal generator 12a includes correlation series generators 21a and 22a in place of the correlation series generators 21 and 22 depicted in FIG. 5. The correlation series generator 21a is substantially the same as the correlation series generator 21 and generates an artificial noise series AN1 from a data series S. In the meantime, the correlation series generator 22a generates an artificial noise series AN2 from the data series S, unlike the correlation series generator 22.

The number of symbols of the data series S and the numbers of symbols of the individual artificial noise series AN1 and AN2 are equal. The threshold $C_{S-AN1}$ used by the correlation series generator 21a and the threshold $C_{S\text{-}AN2}$ used by the correlation series generator 22a may be the same or different from each other. The configurations and operations of the receiver 11, the signal combiner 13, the transmitter 14, and the mappers 23-25 are substantially the same in the first to third embodiments.

Fourth Embodiment

In the first to third embodiments, there are correlations between transmission data and artificial noises. In the fourth embodiment, by contrast, artificial noises are generated independently of transmission data.

Figure 12:
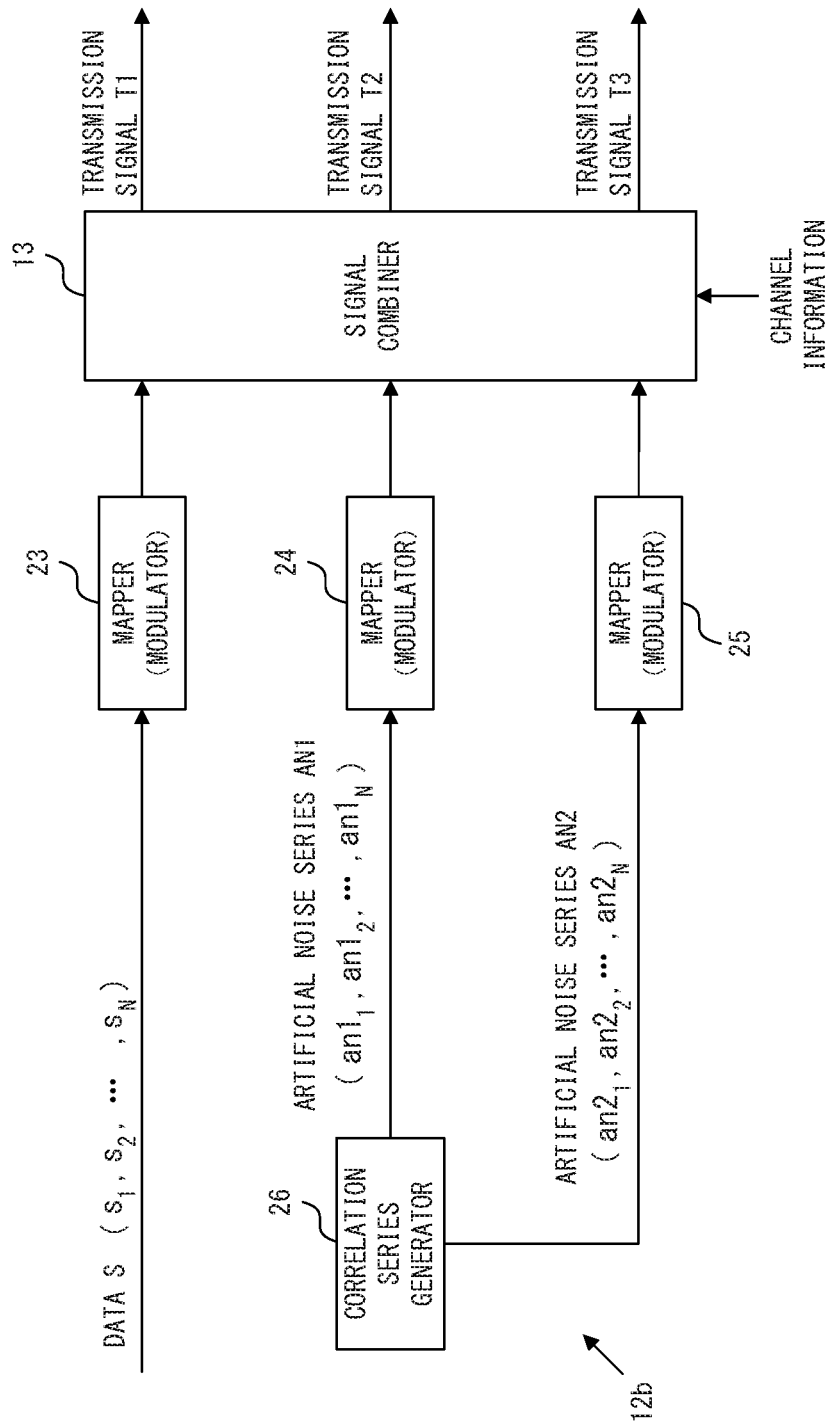
FIG. 12 illustrates an example of a signal generator in accordance with a fourth embodiment.

FIG. 12 illustrates an example of a signal generator in accordance with the fourth embodiment. In the fourth embodiment, a signal generator 12b includes a correlation series generator 26 in place of the correlation series generators 21 and 22 depicted in FIG. 5. The correlation series generator 26 generates artificial noise series AN1 and AN2 independently of a data series S. Thus, there are no correlations between the data series S and the artificial noise series AN1 and AN2. However, both of the numbers of symbols of the artificial noise series AN1 and AN2 are equal to that of the data series S. Meanwhile, there are correlations between the artificial noise series AN1 and AN2. The degree of correlation between the artificial noise series AN1 and AN2 is designated by the threshold C.

Variation

In the examples described above, the wireless device includes three transmission antennas, and three signal series (data series S and artificial noise series AN1 and AN2) are combined and output. However, the present invention is not limited to this configuration. In particular, the wireless device may include N (N is an integer that is 4 or larger) transmission antennas and combine and output N signal series. In this case, the first artificial noise series is generated from the data series, and an i-th (i=2 to N−1) artificial noise series is generated according to an (i−1)-th artificial noise series. As a result, (N−1) artificial noise series are generated. Then, the data series and the (N−1) artificial noise series are combined and output.

In the examples described above, the wireless device 10 or 30 is operated as the base station 1 depicted in FIG. 1. However, the present invention is not limited to this configuration. In particular, the wireless device 10 or 30 may be operated as the terminal device depicted in FIG. 1 or as any other wireless device.

Hardware Configuration

Figure 13:
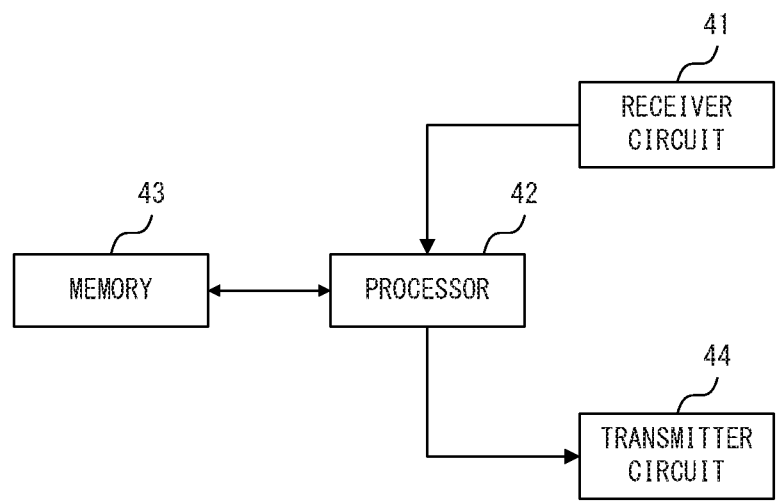
FIG. 13 illustrates an example of the hardware configuration of a wireless device.

FIG. 13 illustrates an example of the hardware configuration of a wireless device. In this example, the wireless device includes a receiver circuit 41, a processor 42, a memory 43, and a transmitter circuit 44. The receiver circuit 41 corresponds to the receiver 11 depicted in FIG. 4 and receives and demodulates a wireless signal. The processor 42 provides the functions of the signal generator 12 and the signal combiner 13 by executing a program stored in the memory 43. In this case, the program describes the procedures of the flowcharts depicted in FIGS. 6-7. The transmitter circuit 44 corresponds to the transmitter 14 depicted in FIG. 4 and outputs a transmission signal via an antenna.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A wireless device comprising:
    a plurality of antennas;
    a first correlation series generator configured to generate a first correlation series based on transmission data;
    a second correlation series generator configured to generate a second correlation series based on the first correlation series;
    a first modulator configured to modulate the transmission data to generate a first modulated signal;
    a second modulator configured to modulate the first correlation series to generate a second modulated signal;
    a third modulator configured to modulate the second correlation series to generate a third modulated signal;
    a signal combiner configured to combine the first modulated signal, the second modulated signal and the third modulated signal to generate a first transmission signal, a second transmission signal and a third transmission signal; and
    a transmitter configured to output the first transmission signal, the second transmission signal and the third transmission signal respectively via a first antenna, a second antenna and a third antenna among the plurality of antennas.

2. The wireless device according to claim 1, wherein
a number of symbols of the transmission data, a number of symbols of the first correlation series, and a number of symbols of the third correlation series are equal.

3. The wireless device according to claim 1, wherein
the first to third modulators use a same modulation scheme.

4. The wireless device according to claim 3, wherein
a correlation between the transmission data and the first correlation series and a correlation between the first correlation series and the second correlation series are respectively determined according to a number of bits per symbol of the modulation scheme.

5. The wireless device according to claim 1, wherein
a correlation between the transmission data and the first correlation series and a correlation between the first correlation series and the second correlation series are respectively determined according to a correlation between a plurality of wireless channels configured between a destination node and the first to third antennas.

6. The wireless device according to claim 1, wherein
a correlation between the transmission data and the first correlation series and a correlation between the first correlation series and the second correlation series are respectively determined according to a number of antennas of the wireless device.

7. The wireless device according to claim 1, wherein
according to a state of a wireless channel between the wireless device and a destination node, the signal combiner combines the first modulated signal, the second modulated signal and the third modulated signal to generate the first transmission signal, the second transmission signal and the third transmission signal in a manner such that the first correlation series and the second correlation series are canceled out at the wireless channel.

8. The wireless device according to claim 1, wherein
when the wireless device includes N antennas, N being an integer that is 4 or larger,
- (N−1) correlation series that include the first correlation series and the second correlation series are generated,
- (N−1) modulated signals that include the second modulated signal and the third modulated signal are respectively generated from the (N−1) correlation series, and
- the signal combiner combines the first modulated signal and the (N−1) modulated signals to generate N transmission signals that include the first transmission signal, the second transmission signal and the third transmission signal, and the transmitter outputs the N transmission signals via the N antennas.

9. A wireless communication method comprising:
generating a first correlation series based on transmission data,
generating a second correlation series based on the first correlation series,
modulating the transmission data to generate a first modulated signal,
modulating the first correlation series to generate a second modulated signal,
modulating the second correlation series to generate a third modulated signal,
combining the first modulated signal, the second modulated signal and the third modulated signal to generate a first transmission signal, a second transmission signal and a third transmission signal, and
outputting the first transmission signal, the second transmission signal and the third transmission signal respectively via a first antenna, a second antenna and a third antenna.

10. A wireless device comprising:
a plurality of antennas;
a first correlation series generator configured to generate a first correlation series based on transmission data;
a second correlation series generator configured to generate a second correlation series based on the transmission data;
a first modulator configured to modulate the transmission data to generate a first modulated signal;
a second modulator configured to modulate the first correlation series to generate a second modulated signal;
a third modulator configured to modulate the second correlation series to generate a third modulated signal;
a signal combiner configured to combine the first modulated signal, the second modulated signal and the third modulated signal to generate a first transmission signal, a second transmission signal and a third transmission signal; and
a transmitter configured to output the first transmission signal, the second transmission signal and the third transmission signal respectively via a first antenna, a second antenna and a third antenna among the plurality of antennas.

11. A wireless device comprising:
a plurality of antennas;
a correlation series generator configured to generate a first correlation series and a second correlation series, the second correlation series being correlated with the first correlation series;
a first modulator configured to modulate transmission data to generate a first modulated signal;
a second modulator configured to modulate the first correlation series to generate a second modulated signal;
a third modulator configured to modulate the second correlation series to generate a third modulated signal;
a signal combiner configured to combine the first modulated signal, the second modulated signal and the third modulated signal to generate a first transmission signal, a second transmission signal and a third transmission signal; and
a transmitter configured to output the first transmission signal, the second transmission signal and the third transmission signal respectively via a first antenna, a second antenna and a third antenna among the plurality of antennas.

* * * * *